United States Patent
Fritz et al.

(10) Patent No.: US 10,464,436 B2
(45) Date of Patent: Nov. 5, 2019

(54) BATTERY SYSTEM FOR A HYBRID VEHICLE

(71) Applicant: Samsung SDI Co., Ltd., Yongin-si, Gyeonggi-do (KR)

(72) Inventors: Jurgen Fritz, Graz (AT); Thomas Korherr, Hartberg (AT)

(73) Assignee: Samsung SDI Co., Ltd., Yongin-si (KR)

(*) Notice: Subject to any disclaimer, the term of this patent is extended or adjusted under 35 U.S.C. 154(b) by 237 days.

(21) Appl. No.: 15/586,914

(22) Filed: May 4, 2017

(65) Prior Publication Data
US 2018/0029490 A1    Feb. 1, 2018

(30) Foreign Application Priority Data

Jul. 27, 2016    (EP) .................................... 16181442

(51) Int. Cl.
*B60L 58/18*    (2019.01)
*B60L 11/18*    (2006.01)
(Continued)

(52) U.S. Cl.
CPC ......... *B60L 11/1853* (2013.01); *B60L 3/0046* (2013.01); *B60L 58/12* (2019.02);
(Continued)

(58) Field of Classification Search
CPC ................................................. B60L 11/1861
See application file for complete search history.

(56) References Cited

U.S. PATENT DOCUMENTS

| 6,130,813 A | 10/2000 | Kates et al. |
| 6,150,797 A | 11/2000 | Mukainakano |

(Continued)

FOREIGN PATENT DOCUMENTS

| DE | 10-2006-050529 A1 | 4/2008 |
| DE | 10 2010 007 452 A1 | 8/2011 |

(Continued)

OTHER PUBLICATIONS

EPO Office Action dated Feb. 2, 2018, for corresponding European Patent Application No. 16181442.1 (7 pages).

(Continued)

*Primary Examiner* — Alfonso Perez Borroto
*Assistant Examiner* — Esayas G Yeshaw
(74) *Attorney, Agent, or Firm* — Lewis Roca Rothgerber Christie LLP

(57) ABSTRACT

A battery system for a vehicle is provided. The battery system includes: first and second output terminals; a battery pack including a primary pole and a secondary pole which are respectively electrically connected or connectable to one of the first and second output terminals; an electrically operable pre-charge switch electrically connected to the primary pole of the battery pack and to the first output terminal; a first resistor arranged in series with the electrically operable pre-charge switch; an isolation monitoring circuit adapted to monitor the overall isolation of the battery system; a semiconductor switch adapted to bidirectionally conduct a current in a first state and to bidirectionally block the current in a second state; and a second resistor arranged in series with the first resistor and in parallel with the semiconductor switch.

14 Claims, 3 Drawing Sheets

(51) Int. Cl.
*H02J 7/00* (2006.01)
*B60L 3/00* (2019.01)
*B60L 58/12* (2019.01)

(52) U.S. Cl.
CPC ............ *B60L 58/18* (2019.02); *H02J 7/0021* (2013.01); *H02J 7/0031* (2013.01); *H02J 7/0045* (2013.01); *H02J 7/0068* (2013.01); *B60L 2240/545* (2013.01); *B60L 2240/547* (2013.01); *B60L 2240/549* (2013.01); *Y02T 10/7055* (2013.01)

(56) References Cited

U.S. PATENT DOCUMENTS

| | | | | |
|---|---|---|---|---|
| 6,265,848 | B1 * | 7/2001 | Mukainakano | H02J 7/0021 320/132 |
| 7,531,986 | B2 * | 5/2009 | Eager | H02J 7/0068 320/110 |
| 9,787,179 | B1 * | 10/2017 | Clarkin | H02M 3/156 |
| 2006/0021098 | A1 | 1/2006 | Tezuka | |
| 2012/0306264 | A1 | 12/2012 | Komma et al. | |
| 2013/0314097 | A1 * | 11/2013 | Hausberger | B60L 3/0069 324/503 |
| 2014/0062387 | A1 * | 3/2014 | Kim | H02J 7/007 320/107 |
| 2016/0089998 | A1 * | 3/2016 | Thommes | H02H 11/005 701/22 |
| 2018/0048242 | A1 * | 2/2018 | Ichiki | H02M 5/27 |
| 2018/0123363 | A1 * | 5/2018 | Kim | H01M 10/615 |

FOREIGN PATENT DOCUMENTS

| | | |
|---|---|---|
| DE | 102011118716 A1 | 5/2013 |
| DE | 10 2013 008 586 A1 | 11/2014 |
| EP | 2 570 289 A1 | 3/2013 |
| KR | 10-2006-0014029 | 2/2006 |
| KR | 10-2013-0039817 | 4/2013 |

OTHER PUBLICATIONS

European Search Report of corresponding EP Application No. 16181442.1, dated Dec. 9, 2016, 9 pages.

* cited by examiner (Related Art)

BATTERY SYSTEM FOR A HYBRID VEHICLE

CROSS-REFERENCED TO RELATED APPLICATION

This application claims priority to and the benefit of European Patent Application No. 16181442.1, filed on Jul. 27, 2016 in the European Patent Office, the content of which is incorporated herein by reference in its entirely.

BACKGROUND

1. Field

Aspects of embodiments of the present invention relate to a battery system for a hybrid vehicle.

2. Description of the Related Art

A rechargeable battery system (e.g., a rechargeable or secondary battery) differs from a primary battery system (e.g., a primary battery) in that it is designed to be repeatedly charged and discharged, while the latter provides an irreversible conversion of chemical to electrical energy. Low-capacity rechargeable battery systems are used as, for example, a power supply for small electronic devices, such as cellular phones, notebook computers, and camcorders, while high-capacity rechargeable battery systems are used as, for example, a power supply for driving motors in hybrid vehicles and the like.

Such rechargeable battery systems, for example, high-voltage rechargeable battery systems, should be selectively electrically isolated from components (e.g., high-voltage components) that they are connected to and from surroundings they are used or accommodated in. For example, the high-voltage components of a battery system used for (e.g., used to power) a driving motor in a hybrid vehicle should be configured such that they are isolatable or separable (e.g., electrically isolatable or separable) from the high-voltage components of the hybrid vehicle (e.g., of the chassis of the hybrid vehicle). According to regulations for battery driven electric vehicles (e.g., ECE-R100), isolation from such components may, from among other methods, be performed via an isolator (e.g., via an isolation means), which, in an equivalent network diagram, is represented by resistors (e.g., isolation resistors). Such isolation is often monitored by an isolation monitoring circuit.

A circuit of a battery system 100 of the related art including isolation resistors 7 and an isolation monitoring circuit 50 as mentioned is shown in FIG. 1.

The battery system 100 shown in FIG. 1 includes two output terminals 1, 2 that are, in the illustrated exemplarily embodiment, electrically connected with a load impedance 20 of a driving motor of a hybrid vehicle. The battery system 100 further includes a battery pack 90 with primary and secondary poles 91, 92, each electrically connected to one of the output terminals 1, 2. In this example, the primary pole 91 represents a negative pole of the battery pack 90 and is isolated from a chassis ground of the vehicle by the isolation resistor 7. The secondary pole 92 represents a positive pole of the battery pack 90 and is also isolated from the chassis ground by the other isolation resistor 7. It shall be mentioned that, in this example, the isolation resistor 7 is directly connected to the chassis ground, and the other chassis ground symbol at the opposing end of the circuit diagram shown in FIG. 1 represents a ground (GND) of the overall electric system of the vehicle, which is also connected to the chassis ground.

In this example of the battery system 100 of the related art, the isolation monitoring circuit 50, from among other components, includes a battery management unit and two reference resistors 6, each of which is electrically connectable to a reference potential of the battery system (e, q., a ground of a high-voltage component of the battery system). The reference potential of the battery system and the chassis ground of the vehicle may be connected to ensure the function of the isolation monitoring circuit 50. The reference resistors 6 may be respectively electrically connected to the poles 91, 92 of the battery pack 90 via switches 6-1. The battery system 100 further includes a plurality of voltmeters 5, which are electrically connected to the battery management unit.

Via the voltmeters 5, the isolation monitoring circuit 50 is adapted to measure and monitor the voltage supplied by the battery pack 90 (e.g., the voltage between the poles 91, 92) and between the poles 91, 92 and the chassis ground of the vehicle. Furthermore, the isolation monitoring circuit 50 is adapted to use these measured voltages within a monitoring process of the overall isolation (e.g., the total isolation) of the battery system 100. The poles 91, 92 may be respectively electro-mechanically separated from the output terminals 1, 2 of the battery system 100 via relays 8.

The battery system 100 shown in FIG. 1 further includes a pre-charge relay 10 arranged in parallel with the relay 8 that is arranged along a conductive path between the primary pole 91 and the first output terminal 1 of the battery system 100. A first resistor 21, which acts as a pre-charge resistor, is arranged in series with the pre-charge relay 10. Furthermore, a switch 18 (e.g., an additional switch) adapted to couple a high-voltage circuit of the vehicle to the battery system 100 via a second resistor 22 (also called a coupling resistor) is arranged in parallel with the pre-charge relay 10. To obtain a measurement of the overall isolation of the battery system 100 by using the isolation monitoring circuit 50, the switch 18 is closed and the measurement is obtained.

Other examples of battery systems including isolation monitoring circuits are disclosed in US 2013/0314097 A1, which describes a device for detecting the isolation resistance of a high-voltage battery system.

As can be seen above, in battery systems 100 of the related art, the additional switch 18 is provided to perform the isolation monitoring. Such additional switches, which are often provided as highly robust relays, increase the production cost of such battery systems and often have to be mounted via so-called through-hole technology (THT) because it is often disadvantageous to attach such additional switches to the battery system as an SMD part (e.g., as a surface-mount device using SMT or surface-mount technology).

SUMMARY

One or more of the drawbacks of known battery systems can be avoided or at least reduced or mitigated by aspects and features of the present invention. For example, a battery system for a vehicle is provided which includes first and second output terminals and a battery pack. The battery pack includes a primary pole and a secondary pole which are respectively electrically connected or connectable to one of the first and second output terminals. The battery system further includes an electrically operable pre-charge switch that is electrically connected to the primary pole of the battery pack and to the first output terminal of the battery system. The battery system further includes a first resistor arranged in series with the electrically operable pre-charge switch, an isolation monitoring circuit, and a semiconductor switch that is adapted to bidirectionally conduct a current in a first state and to bidirectionally block the current in a second state. The isolation monitoring circuit is adapted to monitor the overall isolation of the battery system. According to embodiments of the present invention, a second resistor is arranged in series with the first resistor and in parallel with the semiconductor switch.

In such a battery system, isolation monitoring may be performed by using (e.g., by only using) a pre-charge path of the battery system. Therefore, an expensive, additional switch, such as an expensive relay, may be omitted, thereby reducing the overall production costs of the battery system while increasing the life expectancy of the battery system.

In some embodiments, the isolation monitoring circuit includes a plurality of reference resistors respectively electrically connectable to a reference potential of the battery system, a plurality of switches respectively arranged in series with ones of the reference resistors and to ones of the primary and secondary poles of the battery pack and a voltmeter. Such an isolation monitoring circuit allows for measuring and monitoring of the overall isolation of the battery system according to regulations for battery driven electric vehicles, such as ECE-R100.

In some embodiments, the second resistor is adapted to couple external high-voltage components to the battery system.

In some embodiments, the second resistor, which is adapted to couple the external high-voltage components to the battery system, is a resistor having a resistance value of at least 100 Ohm/V.

In some embodiments, the semiconductor switch is adapted to bidirectionally conduct or block a current. Furthermore, the semiconductor switch is adapted to conduct or block a current bidirectionally. For example, when the semiconductor switch is in a first state, a current passes along the switching path of the semiconductor switch in two opposite directions. When the semiconductor switch is in a second state, the current cannot pass (e.g., is blocked from passing along) the switching path of the semiconductor switch, regardless of the direction of the current.

In some embodiments, the semiconductor switch includes a thyristor.

In some embodiments, the semiconductor switch includes a plurality of transistors (e.g., two transistors) that are anti-serially connected to each other. With such a battery system, the switching sequence within a pre-charge cycle may be altered such that the transistors are changed (or transferred) into a closed state after the pre-charge switch and/or the electrically operable switches of the battery system, such as the electrically operable switches adapted to separate the primary and secondary poles of the battery pack from the output terminals, are changed into a closed state. With such an alteration of the switching sequence, the electrically operable switch that is adapted to connect and disconnect the positive pole of the battery system from its respective output terminal can switch a current unencumbered and peaks in the switched current may be avoided or mitigated, thereby increasing the overall performance and life expectancy of the respective electrically operable switch and the battery system.

In some embodiments, one or more of the transistors are a field-effect transistor. Field-effect transistors are, generally, cost-efficient and provide stable switching behavior.

In some embodiments, one or more of the transistors are a metal-oxide semiconductor field-effect transistor (i.e., a MOSFET). MOSFETs are compact and, therefore, may be manufactured in a high-density configuration and have a fast response time.

In some embodiments, one or more of the transistors are an n-channel metal-oxide semiconductor field-effect transistor. When ones of the plurality of such transistors are arranged anti-serially, that is, with their respective body diodes pointing in opposite directions, a short coupling of the second resistor is efficiently prevented.

In some embodiments, source-terminals of the transistors are electrically connected with each other. In such embodiments, a driver circuit for the transistors may be simplified.

In some embodiments, control input terminals (e.g., gate-terminals) of the transistors are electrically connected with each other. For example, gate-terminals of the transistors are electrically connected with each other. In such embodiments, control of the transistors, which together act as a switch, is eased.

In some embodiments, the battery pack is adapted to pre-charge an intermediate circuit capacitor via the electrically operable pre-charge switch and the semiconductor switch when the intermediate circuit capacitor is connected to the battery system. In such embodiments, pre-charge of the intermediate circuit capacitor may be performed with a pre-charge resistor along the pre-charge path. In some embodiments, the intermediate circuit capacitor is a DC-link capacitor.

In some embodiments, the battery system further includes an electrically operable switch arranged along a conductive path which electrically interconnects the secondary pole and the first output terminal of the battery system. The battery system is adapted to perform a pre-charge operation of the intermediate circuit capacitor by closing the electrically operable pre-charge switch and the electrically operable switch and subsequently changing the semiconductor switch into a conductive state. In some embodiments, the battery system further includes a battery management unit that is adapted to perform, control, and/or manage the pre-charge operation of the intermediate circuit capacitor by closing the electrically operable pre-charge switch and the electrically operable switch and subsequently changing the semiconductor switch into the conductive state. In such embodiments, the electrically operable pre-charge switch and the electrically operable switch are changed into the conductive state before the semiconductor switch is transferred into the conductive state. Therefore, an inrush current is reduced because the second resistor is not bypassed, which increases the lifetime of the electrically operable pre-charge switch. In some embodiments, the battery management unit is a part of the isolation monitoring circuit.

In some embodiments, the electrically operable pre-charge switch is a relay. Such relays generally have high to infinite resistance and safely switch relatively high currents.

In some embodiments, the isolation monitoring circuit is adapted to measure an isolation resistance of the battery system when the pre-charge switch is in the conductive state and when the semiconductor switch is in the non-conductive state. In some embodiments, the battery system includes a battery management unit that is adapted to measure the overall isolation of the battery system when the pre-charge switch is in the conductive state and when the semiconductor switch is in the non-conductive state. In such embodiments, the measuring and monitoring of the overall isolation of the battery system may be performed with the same or substantially the same quality as is provided by isolation monitoring circuits of battery system of the related art without an additional switch being included to perform the measuring or monitoring.

In some embodiments, the battery management unit of the isolation monitoring circuit is a microprocessor or a microcontroller. With such a battery management unit, the stable control, operation, and management of the battery system and its components is assured.

In some embodiments, the battery management unit is adapted to control the state of the semiconductor switch, the pre-charge switch, and/or of the electrically operable switch. In some embodiments, the battery management unit is adapted to activate the semiconductor switch and the pre-charge switch.

Furthermore, a method of isolation monitoring of a battery system is provided according to embodiments of the present invention. The method includes closing the electrically operable pre-charge switch, maintaining the semiconductor switch in a non-conductive state, and measuring the overall isolation of the battery system via the isolation monitoring circuit. This method allows the overall isolation of the battery system to be measured by using the components arranged along the pre-charge path.

Moreover, a vehicle including a battery system according to embodiments of the present invention is provided. In such a vehicle, the aspects and features of the embodiments of the battery systems mentioned above and further described below come to fruition.

Further aspects and features of the present invention may be learned from the following description of exemplary embodiments thereof.

BRIEF DESCRIPTION OF THE DRAWINGS

Aspects and features of the present invention will become apparent to those of ordinary skill in the art by the following detailed description of exemplary embodiments thereof with reference to the attached drawings, in which.

DETAILED DESCRIPTION

Figure 1:
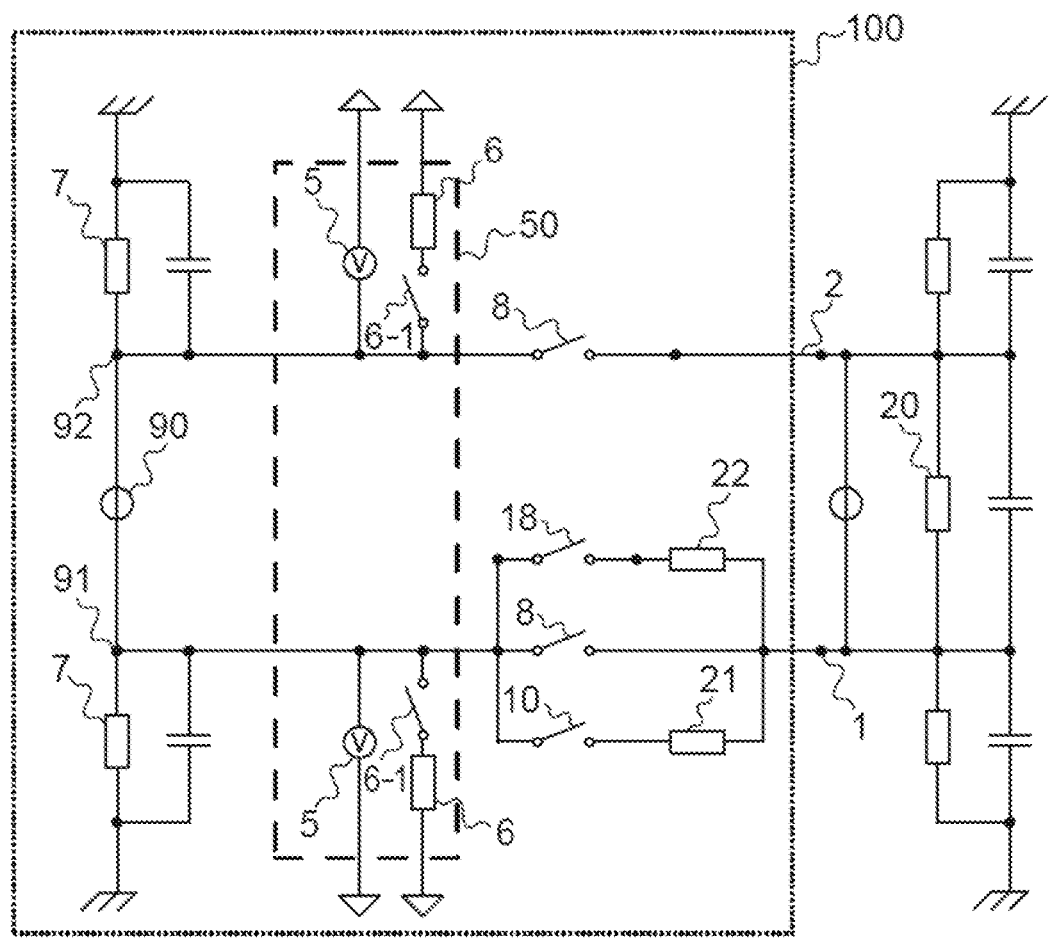
FIG. 1 illustrates a battery system including an isolation monitoring circuit of the related art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The battery management unit and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the battery management unit may be formed on one integrated circuit (IC) chip or on separate IC chips. Further, the various components of the battery management unit may be implemented on a flexible printed circuit film, a tape carrier package (TCP), a printed circuit board (PCB), or formed on a same substrate as the battery management unit. Further, the various components of the battery management unit may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Figure 2:
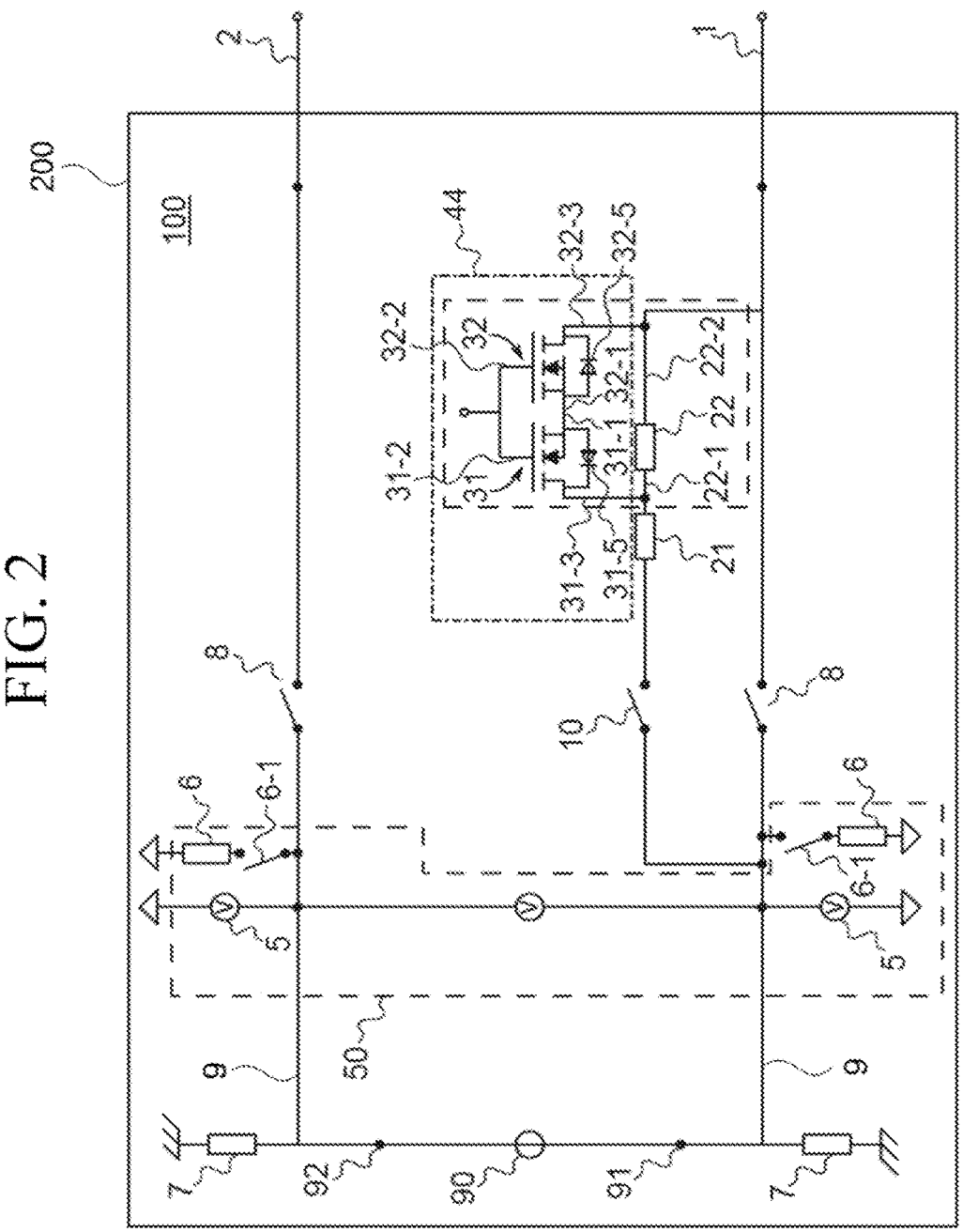
FIG. 2 illustrates a battery system according to a first embodiment of the present invention.

Referring to FIG. 2, a battery system 200 for a hybrid vehicle according to a first exemplary embodiment of the present invention is shown. The battery system 200 includes first and second output terminals 1, 2 for connection with a load. The battery system 200 further includes a battery pack 90 that includes primary and secondary poles 91, 92, which are respectively electrically connected to the first and second output terminals 1, 2. In FIG. 2, the battery pack 90 is indicated by the electronic symbol of a voltage source. The battery pack 90 includes a plurality of electrically interconnected battery cells. In this first embodiment, the primary pole 91 exemplarily represents a negative pole of the battery pack 90, which is electrically connected to the first output terminal 1, and the secondary pole exemplarily represents a positive pole 92 of the battery pack 90, which is electrically connected to the second output terminal 2.

In this first embodiment, conductive paths 9 electrically interconnecting the poles 91, 92 with the output terminals 1, 2 each include an electrically operable switch 8, which, in this first embodiment, are exemplarily provided as relays. However, in other embodiments of the battery system, the electrically operable switches 8 may be omitted. The battery system 200 further includes an electrically operable pre-charge switch 10 that is electrically connected between the primary pole 91 of the battery pack 90 and the first output terminal 1 of the battery system 200. In this first embodiment, the pre-charge switch 10 is exemplarily provided as a pre-charge relay. When the pre-charge relay 10 and the electrically operable switch 8 for the secondary pole 92 of the battery pack 90 are in a closed state and when the electrically operable switch 8 for the primary pole 91 of the battery pack 90 is in an open state, the battery system 200 allows a pre-charge of an intermediate circuit capacitor that is connectable to the output terminals 1, 2 of the battery system 200. However, other switching elements may be used as the electrically operable pre-charge switch 10. Furthermore, a first resistor 21 is arranged in series with the electrically operable pre-charge switch 10. The first resistor 21 acts as a pre-charge resistor that limits a pre-charge current to the pre-charge relay 10 when the electrically operable pre-charge relay 10 is in the closed state.

In this first embodiment, the battery system 200 further includes the isolation monitoring circuit 50 and the two isolation resistors 7 for the isolation of the poles 91, 92 from the chassis, similar to the example of the battery system 100 described with respect to FIG. 1.

The battery system 200 of this first embodiment further includes a second resistor 22 which is adapted to couple external high-voltage components to the battery system 200. The second resistor 22 is arranged in series with the first resistor 21 and in parallel to a semiconductor switch 44. The semiconductor switch 44 is adapted to bidirectionally conduct a current in a first state and to bidirectionally block the current in a second state. In this first embodiment, the semiconductor switch 44 exemplarily includes two transistors 31, 32 that are anti-serially connected to each other. However, the semiconductor switch 44 of the battery system 200 according to other embodiments of the present invention may be provided as or may also include other components, for example, a thyristor.

For example, in this first embodiment, the battery system 200 includes a second resistor 22 that is arranged in series with the electrically operable pre-charge switch 10 and the first resistor 21. The two transistors 31, 32 are, in this first embodiment, field-effect transistors, such as n-channel metal-oxide semiconductor field-effect transistors (i.e., n-MOSFETs), and are anti-serially coupled to each other and are coupled in parallel with the second resistor 22. Therefore, a drain-terminal 31-3 of the first transistor 31 is electrically connected to a first terminal 22-1 of the second resistor 22. In this first embodiment, a source-terminal 31-1 of the first transistor 31 is electrically connected to a source-terminal 32-1 of the second transistor 32. A drain-terminal 32-3 of the second transistor 32 is electrically connected to a second terminal 22-2 of the second resistor 22. Therefore, in FIG. 2, a body diode 31-5 of the first transistor 31 points in a direction that is opposite to the direction of a body diode 32-5 of the second transistor 32, and the body diodes 31-5, 32-5 together form an n-p-p-n-semiconductor structure. Furthermore, in this first embodiment, a gate-terminal 31-2 of the first transistor 31 is electrically connected to a gate-terminal 32-2 of the second transistor 32.

However, other embodiments of battery systems may include other transistors that are not interconnected as in the embodiment shown in FIG. 2.

Figure 3:
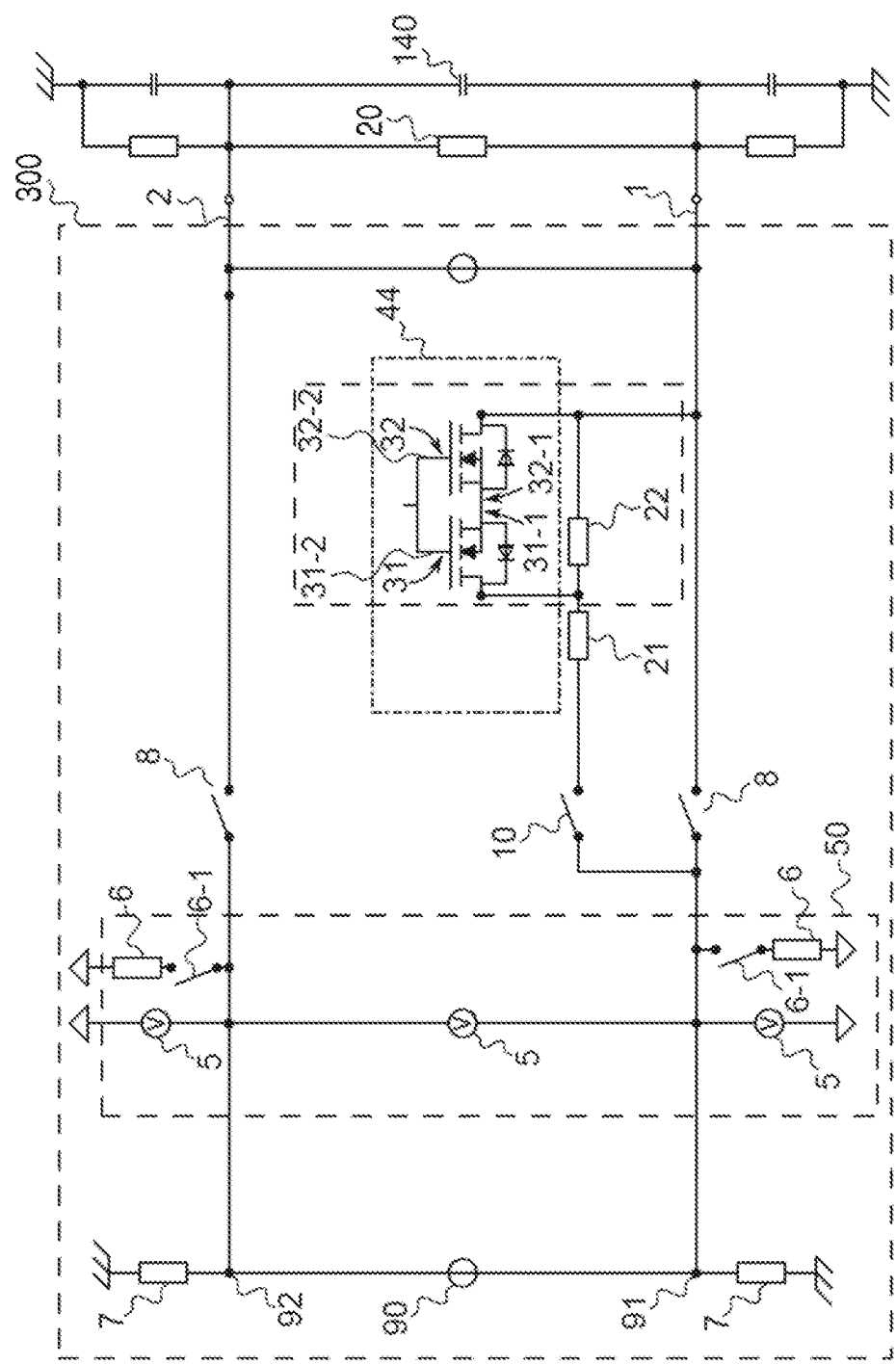
FIG. 3 illustrates a battery system according a second embodiment of the present invention.

FIG. 3 shows a second embodiment of a battery system 300 according to the present invention. For example, the battery system 300 shown in FIG. 3 is substantially the same as the battery system 200 as shown in FIG. 2. Therefore, reference signs and numerals in FIG. 3 which are identical to reference signs and numerals in FIG. 2 denote identical or substantially similar components. However, the battery system 300 shown in FIG. 3 differs from the battery system 200 shown in FIG. 2 with respect to the use and configuration of the two transistors 31, 32 and the series connection of the first and the second resistors 21, 22. For example, in the battery system 300 shown in FIG. 3, no additional switch 18 (refer to, for example, FIG. 1) is provided. Instead, the battery system 300 according to the second embodiment includes an electrically operable pre-charge switch 10, which, in this second embodiment, is provided as a pre-charge relay that is arranged in parallel with an electrically operable switch 8. The pre-charge relay 10 is arranged in series with a first resistor 21, which, as described with respect to FIG. 2, acts as a pre-charge resistor. The first resistor 21 is serially connected to a second resistor 22, which couples external high-voltage components to the battery system 300. In this second embodiment, the battery system 300 is shown as being exemplarily electrically connected to a load impedance 20 of a driving motor of a vehicle via the output terminals 1, 2. Furthermore, the external high-voltage components coupled to the battery system 300 via the second resistor 22 may be, in one example, high-voltage components of the vehicle. However, it is also possible to realize that these and other embodiments of battery systems according to the present invention may be adapted to power other loads.

In this second embodiment, two transistors 31, 32 are anti-serially interconnected with each other and arranged in parallel with the second resistor 22. Source-terminals 31-1, 32-1 of the transistors 31, 32 are electrically connected with each other. Furthermore, control input terminals 31-2, 32-2

(e.g., gate-terminals) of the transistors 31, 32 are electrically connected with each other. In this second embodiment, the interconnected control input terminals 31-2, 32-2 of the transistors 31, 32 are exemplarily shown as being electrically connected to a battery management unit, which, in this second embodiment, includes the isolation monitoring circuit 50.

In this second embodiment, the battery system 300 is adapted to pre-charge an intermediate circuit capacitor 140 via the electrically operable pre-charge switch 10 and the transistors 31, 32 when the intermediate circuit capacitor 140 is connected to the battery system 300. Furthermore, in this second embodiment, the battery management unit is adapted to perform the pre-charge operation of the intermediate circuit capacitor 140 by closing the electrically operable pre-charge switch 10 and the electrically operable switch 8 that is arranged along the conductive path 9 that electrically interconnects the secondary pole 92 and the second output terminal 2. Then, subsequently, the battery management unit is adapted to change (or transfer) the transistors 31, 32 into a conductive state. For example, to perform the pre-charge operation, the battery management unit in this second embodiment first closes the pre-charge relay 10 and the electrically operable switch 8 for the secondary pole 92 and maintains the electrically operable switch 8 for the first pole 91 in an open state, thereby directing (e.g., forcing) a charge current to flow via the first and the second resistors 21, 22. Then (e.g., after a certain or predetermined amount of time), the battery management unit switches on the transistors 31, 32, changing them into a conductive state, thereby bypassing (e.g., electrically bypassing) the second resistor 22. In this second embodiment, the second resistor 22 is adapted to withstand relatively high power losses. This procedure prevents a high inrush current from destroying or damaging components of the battery system 300 and also avoids high current peaks at the electrically operable switch 8 for the secondary pole 92 when the electrically operable switch 8 is closed. However, in other embodiments of battery systems according to the present invention, the battery management unit or the battery system may be adapted to perform other pre-charge operations. For example, in some embodiments, a pre-charge operation is performed by first changing the pre-charge switch 10 or the two transistors 31, 32 into the conductive state and then, subsequently, changing the electrically operable switch 8 for the secondary pole 92 into the conductive state. In such embodiments, the second resistor 22 may be smaller than the second resistor in the second embodiment of the battery system 300 described above with respect to FIG. 3.

Furthermore, the battery management unit is adapted to perform a measurement of (e.g., is adapted to measure) the overall isolation of the battery system 300 when the pre-charge switch 10 is in the conductive state and when the transistors 31, 32 are in a non-conductive state. To perform the measurement, the battery management unit directs or commands the closure of the pre-charge relay 10, maintains the transistors 31, 32 in an open, non-conductive state, and alternatingly switching on and off (e.g., alternately opens and closes) the switches 6-1 to calculate (or measure) the isolation resistance using the voltages measured by the voltmeters 5 of the isolation monitoring circuit 50. In the second embodiment, the battery management unit is exemplarily adapted to monitor the isolation of the battery system 300 at time intervals (e.g., at certain or predetermined time intervals) and to initiate a counter reaction when the measured voltage crosses a threshold (e.g., a certain or predefined threshold). The counter reaction may, for example, include the opening of the relays 8.

However, it is also possible to realize other battery systems according to the present invention including other components within the insolation monitoring circuit to manage and/or control the measuring and monitoring of the isolation of the battery system.

Although exemplary embodiments of the present invention have been described, it is understood that the present invention should not be limited to these exemplary embodiments and that various changes and modifications may be made thereto by one of ordinary skill in the art within the spirit and scope of the present invention according to the following claims and their equivalents.

What is claimed is:

1. A battery system for a vehicle, the battery system comprising:
   first and second output terminals;
   a battery pack comprising a primary pole and a secondary pole which are respectively electrically connected or connectable to one of the first and second output terminals;
   an electrically operable pre-charge switch electrically connected to the primary pole of the battery pack and to the first output terminal;
   a first resistor arranged in series with the electrically operable pre-charge switch;
   an isolation monitoring circuit adapted to monitor the overall isolation of the battery system;
   a semiconductor switch adapted to bidirectionally conduct a current in a first state and to bidirectionally block the current in a second state; and
   a second resistor arranged in series with the first resistor and in parallel with the semiconductor switch,
   wherein the first resistor, the semiconductor switch, and the second resistor are arranged electrically between the isolation monitoring circuit and the first output terminal.

2. The battery system of claim 1, wherein the isolation monitoring circuit comprises:
   a plurality of reference resistors electrically connectable to a chassis ground of the vehicle;
   a plurality of voltmeters; and
   a plurality of switches respectively arranged in series with ones of the reference resistors and to the primary and secondary poles of the battery pack and the voltmeters.

3. The battery system of claim 1, wherein the semiconductor switch comprises a plurality of transistors that are anti-serially connected to each other.

4. The battery system of claim 3, wherein at least one of the transistors is a field-effect transistor.

5. The battery system of claim 4, wherein the at least one of the transistors is a metal-oxide semiconductor field-effect transistor.

6. The battery system of claim 5, wherein the at least one of the transistors is an n-channel metal-oxide semiconductor field-effect transistor.

7. The battery system of claim 4, wherein source-terminals of the transistors are electrically connected with each other.

8. The battery system of claim 7, wherein control input terminals of the transistors are electrically connected with each other.

9. The battery system of claim 1, wherein the battery pack is adapted to pre-charge an intermediate circuit capacitor via the electrically operable pre-charge switch and the semiconductor switch when the intermediate circuit capacitor is connected to the first and second output terminals.

10. The battery system of claim 9, further comprising an electrically operable switch arranged along a conductive path that electrically interconnects the secondary pole of the battery pack and the second output terminal,
   wherein the battery pack is further adapted to pre-charge the intermediate circuit capacitor by closing the electrically operable pre-charge switch and the electrically operable switch and subsequently changing the semiconductor switch into a conductive state.

11. The battery system of claim 1, wherein the electrically operable pre-charge switch is a relay.

12. The battery system of claim 1, wherein the isolation monitoring circuit is further adapted to measure an isolation resistance of the battery system when the electrically operable pre-charge switch is in a conductive state and when the semiconductor switch is in the second state.

13. A method of isolation monitoring of a battery system, the battery system comprising: first and second output terminals; a battery pack comprising a primary pole and a secondary pole which are respectively electrically connected or connectable to one of the first and second output terminals; an electrically operable pre-charge switch electrically connected to the primary pole of the battery pack and to the first output terminal; a first resistor arranged in series with the electrically operable pre-charge switch; an isolation monitoring circuit; a semiconductor switch adapted to bidirectionally conduct a current in a first state and to bidirectionally block the current in a second state; and a second resistor arranged in series with the first resistor and in parallel with the semiconductor switch, the method comprising:
   closing the electrically operable pre-charge switch;
   maintaining the semiconductor switch in the second state; and
   measuring the overall isolation of the battery system via the isolation monitoring circuit.

14. A vehicle comprising a battery system, the battery system comprising:
   first and second output terminals;
   a battery pack comprising a primary pole and a secondary pole which are respectively electrically connected or connectable to one of the output terminals;
   an electrically operable pre-charge switch electrically connected to the primary pole of the battery pack and to the first output terminal;
   a first resistor arranged in series with the electrically operable pre-charge switch;
   an isolation monitoring circuit adapted to perform monitoring of the overall isolation of the battery system;
   a semiconductor switch that is adapted to bidirectionally conduct a current in a first state and to bidirectionally block the current in a second state; and
   a second resistor arranged in series with the first resistor and in parallel with the semiconductor switch,
   wherein the first resistor, the semiconductor switch, and the second resistor are arranged electrically between the isolation monitoring circuit and the first output terminal.

* * * * *